United States Patent
Kim et al.

(10) Patent No.: US 8,518,607 B2
(45) Date of Patent: Aug. 27, 2013

(54) METHOD FOR PREPARING MEMBRANE ELECTRODE ASSEMBLY USING LOW-TEMPERATURE TRANSFER METHOD, MEMBRANE ELECTRODE ASSEMBLY PREPARED THEREBY, AND FUEL CELL USING THE SAME

(75) Inventors: Soo-Kil Kim, Seoul (KR); Jae Hyung Cho, Seoul (KR); Heung Yong Ha, Seoul (KR); In Hwan Oh, Seoul (KR); Tae Hoon Lim, Seoul (KR); Suk-woo Nam, Seoul (KR); Seong Ahn Hong, Seoul (KR)

(73) Assignee: Korea Institute of Science & Technology, Seoul (KR)

( * ) Notice: Subject to any disclaimer, the term of this patent is extended or adjusted under 35 U.S.C. 154(b) by 975 days.

(21) Appl. No.: 12/402,182

(22) Filed: Mar. 11, 2009

(65) Prior Publication Data
US 2009/0233148 A1    Sep. 17, 2009

(30) Foreign Application Priority Data

Mar. 13, 2008 (KR) .......................... 10-2008-0023456

(51) Int. Cl.
*H01M 8/00* (2006.01)
(52) U.S. Cl.
USPC .......................................................... 429/535

(58) Field of Classification Search
USPC .................................................. 429/400–535
See application file for complete search history.

(56) References Cited

U.S. PATENT DOCUMENTS

| | | | |
|---|---|---|---|
| 3,956,014 A * | 5/1976 | Landsman et al. ............ | 429/524 |
| 6,641,862 B1 | 11/2003 | Grot | |
| 6,933,003 B2 | 8/2005 | Yan | |
| 2002/0136940 A1 | 9/2002 | Mao et al. | |
| 2006/0247364 A1 * | 11/2006 | Murray et al. ................ | 524/495 |

FOREIGN PATENT DOCUMENTS

| | | |
|---|---|---|
| JP | 2006-185800 | 7/2006 |
| JP | 2007-048701 | 2/2007 |
| JP | 2007-66597 | 3/2007 |
| KR | 2001-0092802 | 10/2001 |

OTHER PUBLICATIONS

Korean Notice of Allowance for Korean Application 10-2008-0023456 mailed Jul. 2, 2012 (English Translation).

* cited by examiner

*Primary Examiner* — Patrick Ryan
*Assistant Examiner* — Muhammad Siddiquee
(74) *Attorney, Agent, or Firm* — Merchant & Gould P.C.

(57) ABSTRACT

A membrane-electrode assembly (MEA) is prepared by a low-temperature transfer method. A binder-free carbon layer is formed on a transfer substrate so as to avoid decreased performance due to the formation of a skin layer caused by the interfacial segregation of the ionomer or binder.

13 Claims, 7 Drawing Sheets ized polymer film such as Teflon, Kapton, etc., and high temperature of about 200° C. and high pressure of about 10 MPa may be applied to transfer the catalyst layer from the transfer substrate to a polymer electrolyte membrane. This method may be advantageous in performance and long-term operation property because a thin catalyst layer can be obtained and the contact resistance between the catalyst layer and the polymer electrolyte membrane may be lower as compared to MEAs prepared otherwise.

The high-temperature transfer method may require a high temperature of about 150° C. or above, i.e., a temperature higher than the glass transition temperature of the polymer electrolyte membrane. For reference, a usual transfer temperature in the high-temperature transfer method may be about 180° C. or more. If the temperature is lower than about 180° C., the catalyst layer may not be well transferred.

In order to prevent deformation of the polymer electrolyte membrane at high temperature, an $H^+$-type polymer electrolyte membrane may need to be substituted to have $Na^+$-type, $TBAOH^+$-type, etc., which substitution can raise the glass transition temperature. The MEA may be substituted again to have $H^+$-type by immersing the MEA in aqueous sulfuric acid solution after transfer of the catalyst layer.

METHOD FOR PREPARING MEMBRANE ELECTRODE ASSEMBLY USING LOW-TEMPERATURE TRANSFER METHOD, MEMBRANE ELECTRODE ASSEMBLY PREPARED THEREBY, AND FUEL CELL USING THE SAME

This application claims benefit of Serial No. 10-2008-0023456, filed Mar. 13, 2008 in South Korea and which application(s) are incorporated herein by reference. A claim of priority to all, to the extent appropriate is made.

BACKGROUND

1. Field

This disclosure relates to a method for preparing a membrane electrode assembly (MEA) using a low-temperature transfer method, an MEA prepared thereby, and a fuel cell using the same.

2. Background of the Related Art

A polymer electrolyte membrane fuel cell (PEMFC) generates electricity through electrochemical reaction of fuel such as hydrogen, methanol, etc. (on the anode side) and air (on the cathode side). Since the PEMFC may operate continuously for a long period of time as long as the fuel is supplied, it may have advantages over the secondary cells that it does not have problems of limited capacity, inconvenience due to charging, or the like.

One of the key elements of PEMFC is a membrane electrode assembly (MEA).

Methods for preparing MEA may be classified into catalyst-coated substrate (CCS) method and catalyst-coated membrane (CCM) method.

In CCS methods, a catalyst layer may be formed on a porous gas diffusion substrate to prepare an anode and a cathode. Then, after positioning a polymer electrolyte membrane between the anode and the cathode, high pressure and temperature is applied to prepare an MEA.

In CCM methods, a catalyst layer may be directly coated on a polymer electrolyte membrane to prepare an MEA. It is known that the CCM method may provide better performance and endurance than the CCS method, in general.

The CCM methods may include brushing, screen printing, tape casting, spraying, transferring, etc.

The transfer method is known to be advantageous in large-scale production over other methods. High-temperature transferring has been often used for the transfer method.

In the high-temperature transfer method, a catalyst layer may be coated on a transfer substrate made of a non-ion-conductive polymer film such as Teflon, Kapton, etc., and

SUMMARY

In embodiments, a low-temperature transfer method are used for preparing membrane electrode assembly (MEA) instead of high-temperature transfer method. In the low-temperature transfer method according to the embodiments, a formation of a thin skin layer acting as barrier to material transport and/or as electrical resistance can be inhibited or prevented.

That is, when the catalyst layer is transferred from the transfer substrate, ionomers in the catalyst layer may be segregated at the interface between the transfer substrate and the catalyst layer because of the hydrophobic bonding between the ionomers and the transfer substrate, thereby resulting in a thin skin layer of ionomers on top of the catalyst layer after the catalyst layer is transferred.

Further, if a layer containing a binder such as a hydrophobic polymer binder or a Nafion ionomer binder or the like is formed on the transfer substrate and the catalyst layer is formed on the binder-containing layer, the binder may be segregated at the interface between the binder-containing layer and the transfer substrate to form a thin skin layer, because of the hydrophobic bonding between the binder in the binder-containing layer and the transfer substrate. The thin skin layer may remain on top of the catalyst layer after the catalyst layer is transferred.

Such a thin skin layer of ionomer or binder may be located on the outer surface of the electrode at which reactants are introduced and, to this end, increase a resistance to material transport and/or an electrical resistance.

According to the embodiments, a large-sized MEA are prepared in large-scale using a low-temperature transfer method without the formation of the skin layer due to the interfacial segregation of ionomer or binder. In the embodiments, an increase of resistance to material transport, an increase of electrical resistance, a decrease of cell performance etc. resulting from the skin layer can be inhibited or prevented.

Disclosed herein is in an embodiment a method for preparing an MEA using a low-temperature transfer method, wherein the method includes: coating a carbon slurry consisting of carbon powder and solvent on a transfer substrate and drying the carbon slurry to form a carbon layer, the carbon layer being a binder-free (e.g. polymer binder-free or Nafion ionomer binder-free); applying a catalyst slurry on the binder-free carbon layer to form a catalyst layer; and transferring the binder-free carbon layer and the catalyst layer to a polymer electrolyte membrane.

As for another embodiment, an outer ionomer layer is further formed on the catalyst layer, and then, the binder-free carbon layer, the catalyst layer and the outer ionomer layer are transferred to the polymer electrolyte membrane.

As for another embodiment, an electrode frame is attached to the transfer substrate on which the binder-free carbon layer is formed, and then the catalyst slurry is applied inside the electrode frame to form the catalyst layer and the catalyst frame is removed.

Disclosed herein too are in an embodiment an MEA prepared by the method and fuel cell comprising the MEA.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF EMBODIMENTS

Figure 1:
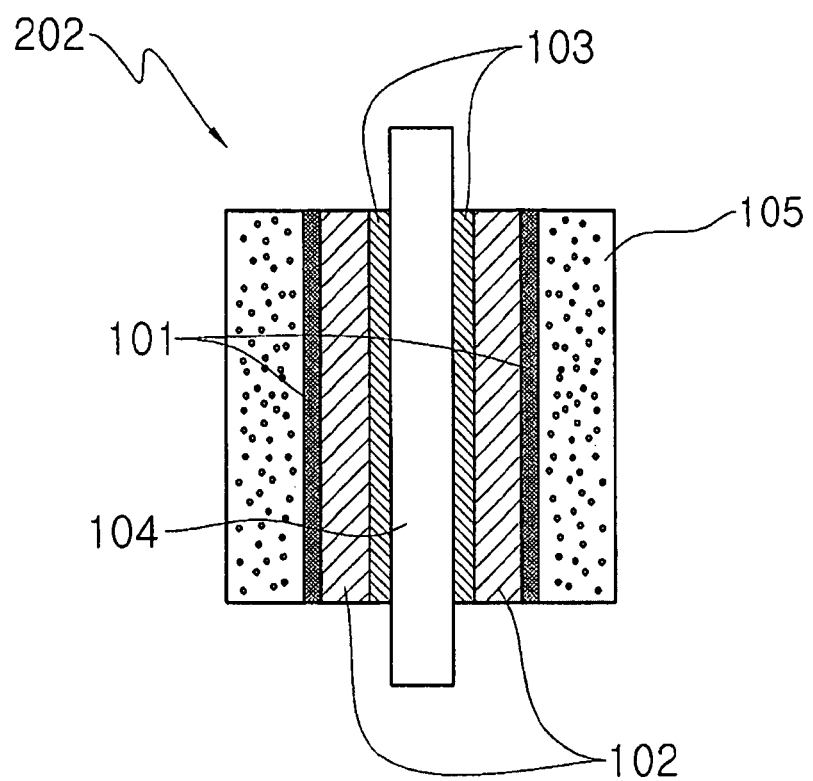
FIG. 1 schematically illustrates a cross-section of a membrane electrode assembly (MEA) according to an embodiment.

Exemplary embodiments now will be described more fully hereinafter with reference to the accompanying drawings, in which exemplary embodiments are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of well-known features and techniques may be omitted to avoid unnecessarily obscuring the presented embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but is included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Hereinafter, a detailed description will be given about a method for preparing a membrane electrode assembly (MEA) using a low-temperature transfer method, an MEA prepared thereby and a fuel cell using the same.

The formation of a thin skin layer due to segregation of the ionomer contained in the catalyst layer or the binder contained in the binder-containing layer at the interface with the transfer substrate layer can be inhibited or prevented according to the embodiments of the low-temperature transfer method. Further, according to the embodiments, a high transfer efficiency may be obtained even at low temperature.

FIG. 1 schematically illustrates a cross-section of an MEA according to an embodiment.

Referring to FIG. 1, an MEA 202 includes a polymer electrolyte membrane 104 covered by outer ionomer layers 103 on both sides. A catalyst layer 102 is formed outside the outer ionomer layers 103.

The outer ionomer layer helps the catalyst layer attach to the membrane and, thereby, enables the catalyst layer to be easily transferred from the transfer substrate to the membrane. However, the outer ionomer layer may not need to be used depending on type of the transfer substrate, surface morphology of the transfer substrate and method for forming catalyst layer.

As in an embodiment, outside the catalyst layer 102, a binder-free carbon layer 101 is formed which can inhibit or prevent the formation of skin layer occurred during transfer process.

The binder-free carbon layer is formed by coating a carbon slurry consisting of carbon powder and solvent on the transfer substrate. The solvent is evaporated from the carbon slurry-coated layer and then the carbon component remains without binder in the binder-free carbon layer.

If the binder-free carbon layer is not formed on the transfer substrate, a thin skin layer of ionomer may occur at the interface (e.g., at the interface between the catalyst layer and the transfer substrate) as the ionomer in the catalyst layer is segregated by chemical and/or physical interaction (e.g., hydrophobic bonding) with the transfer substrate when the catalyst layer is transferred from the transfer substrate. The binder-free carbon layer formed on the transfer substrate can inhibit or prevent the interfacial segregation of the ionomer by inhibiting or preventing interaction between the ionomer and the transfer substrate. As a result, it can inhibit or prevent the formation of a thin skin layer of ionomer and, thereby, improve performance and long-term stability of a fuel cell. Herein, it is important that the carbon layer does not have any binder. If a binder such as Nafion ionomer binder or polymer binder such as polytetrafluoroethylene (PTFE), etc. are contained in the carbon layer, the binder itself may be segregated at the interface by reacting with the transfer substrate to form a thin skin layer of the binder. Further, such segregation of the binder may accelerate the segregation of the ionomer in the catalyst layer at the interface and help the formation of a thin skin layer of ionomer.

At the outermost side of the MEA 202, a gas diffusion layer (GDL) 105 is formed.

Preferably, the binder-free carbon layer may contain the same carbon component as that contained in the GDL. The binder-free carbon layer 101 may remain outside the catalyst layer even after transfer. If the binder-free carbon layer contain the same carbon component as that contained in the GDL, any negative influence to the performance of MEA, which may occur when the GDL is attached to the catalyst layer having the carbon layer 101 thereon, may be avoided.

Figure 2:
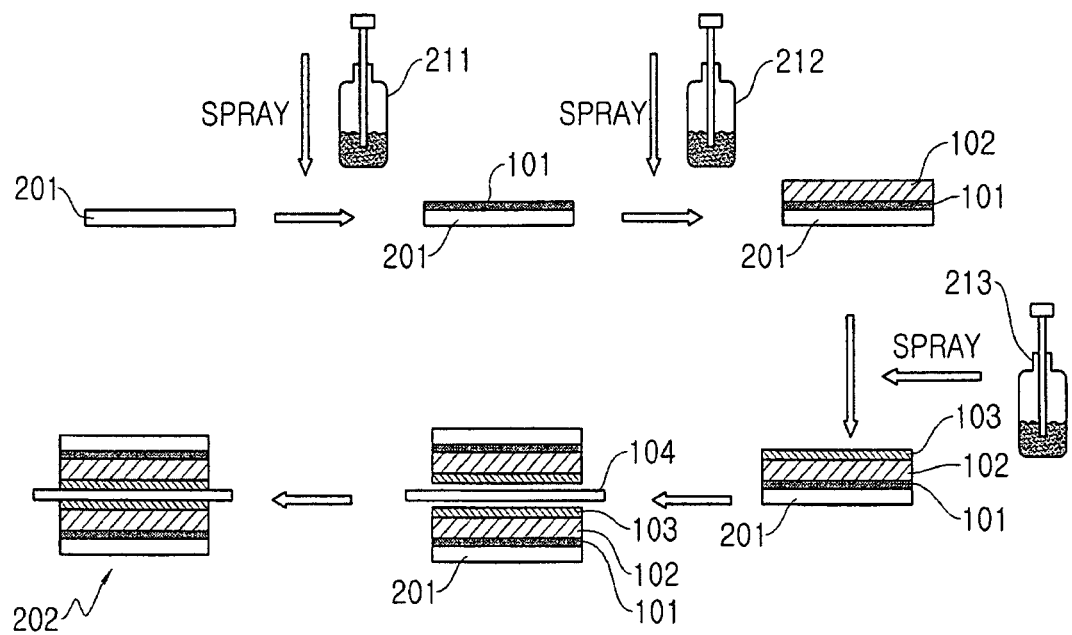
FIG. 2 schematically illustrates a method for preparing an MEA according to an embodiment.

FIG. 2 schematically illustrates a method for preparing an MEA according to an embodiment.

First, as shown in FIG. 2, a transfer substrate 201 is prepared. The transfer substrate 201 may be a non-ion-conductive polymer film.

As for non-limiting examples, one or more selected from a group consisting of polytetrafluoroethylene (PTFE), perfluoroalkoxy (PFA), fluorinated ethylene propylene (FEP), polyvinylidene fluoride (PVDF), polypropylene (PP), polyimide (PI), polyethylene (PE), polycarbonate (PC) and polyethylene terephthalate (PET), or aluminum foil may be used for the transfer substrate.

The polymer film may be a non-porous film without pores or a porous film having pores.

A transfer substrate having pores may have a pore size of about 50 nm to 100 μm and a porosity of about 5 to 90%. The polymer film may have a thickness of about 0.01 to 1 mm. If the pore size, porosity or thickness of the transfer substrate is outside the aforesaid ranges, the transfer efficiency may decrease.

Next, a carbon slurry 211 is prepared in order not to have any binder.

The carbon slurry is prepared by dispersing carbon powder in an organic solvent (e.g., isopropyl alcohol). The carbon powder may be graphite, carbon black, activated carbon, carbon fiber, carbon nanotube, etc, or mixtures thereof, and may have a particle size of about 5 nm to 10 μm. Available non-limiting examples of the carbon powder may include graphite or carbon black such as Ketjen Black, Vulcan carbon powder, or the like. The organic solvent may be an alcohol selected from isopropanol, propanol, ethanol, methanol, etc., or a mixture thereof The carbon slurry should not include any binder since a binder can accelerate the formation of an ionomer skin layer and a skin layer of the binder itself can be formed as well.

As described above, the carbon component contained in the binder-free carbon layer may be the same as that contained in the GDL.

Thus prepared carbon slurry is applied on the transfer substrate 201 and a binder-free carbon layer 101 is formed by sufficiently drying the carbon slurry in an oven at room temperature (25° C.) to about 80° C.

The application of the carbon slurry on the transfer substrate 201 may be carried out by spray coating, screen printing, tape casting, brushing, slot die casting, slurry drying, or the like.

After the formation of the binder-free carbon layer 101, the transfer substrate may have a carbon content of about 0.01 to 2 mg/cm$^2$ based on electrode area, and the carbon layer 101 may have a thickness of about 0.01 to 50 μm.

If the carbon content per unit area is less than the aforesaid range, transfer efficiency may decrease or a skin layer-preventing property may decrease. If the carbon content per unit area exceeds the aforesaid range, the overall electrode may have an increased thickness due to the increase of the remaining carbon content after transfer, and, as a result, resistance of the catalyst layer may increase and thus transport of the materials such as reactants, products, and electrons may be hindered.

Next, a catalyst layer 102 is applied on the transfer substrate 201 on which the binder-free carbon layer 101 is formed.

At first, a catalyst slurry 212 is prepared. A dispersion solvent for the catalyst slurry is prepared. As in non-limiting examples, the dispersion solvent may be prepared from one or more selected from isopropanol, n-propanol, ethanol, methanol, water and n-butyl acetate.

Then, a proton-conductive ionomer is mixed with the dispersion solvent. As for non-limiting examples of the proton-conductive ionomer, a PFSA-based Nafion solution (DuPont) or a hydrocarbon-based polymer electrolyte solution may be used. The content of the ionomer in the catalyst slurry may be determined to be about 2 to 70 wt % of the weight of the catalyst powder included in the slurry, on the basis of dry weight.

The catalyst slurry is stirred using an ultrasonic stirrer or a ball mill in order to prevent coagulation of catalyst particles in the catalyst slurry and to induce formation of small particles. Further, if necessary, a defoaming process is carried out in order to remove foams included in the catalyst slurry. And, an evaporation process is carried out using a rotary evaporator in order to adjust viscosity of the slurry.

The prepared catalyst slurry is applied on the transfer substrate on which the carbon layer is applied. As in non-limiting examples, the application of the catalyst layer may be carried out by spray coating, screen printing, tape casting, brushing, slot die casting, slurry drying, or the like.

Thus prepared transfer substrate on which the catalyst layer is applied is dried in an oven at room temperature to about 80° C. If necessary, the drying may be carried out in vacuum state to control the drying speed. An additional layer of the outer ionomer 103 such as Nafion ionomer may be then formed on the catalyst layer. The amount of outer ionomer is about 0.01 to 0.5 mg/cm$^2$ on the basis of dry weight. This outer ionomer layer acts as an adhesion layer in the subsequent transferring of the catalyst layer to the membrane. The transfer substrate coated with layers of catalyst and outer ionomer is dried in an oven at room temperature to about 80° C. If necessary, the drying may be carried out in vacuum state to control the drying speed.

As a result, an anode catalyst-supported transfer substrate and a cathode catalyst-supported transfer substrate may be prepared, respectively.

Next, an MEA is prepared using the prepared transfer substrate.

First, a polymer electrolyte membrane 104 cut to an adequate size is prepared. The polymer electrolyte membrane 104 may be either a fluorine-containing PFSA-based polymer electrolyte membrane or a fluorine-free hydrocarbon-based polymer electrolyte membrane.

The anode transfer substrate and the cathode transfer substrate are placed on both sides of the electrolyte membrane. Then, hot-pressing is carried out under adequate temperature and pressure so that the catalyst layer is transferred from the transfer substrate to the electrolyte membrane. As a result, an MEA 202 is prepared. The transfer may be carried out at low temperature. Particularly, the transfer may be carried out at about 80 to 150° C. The transfer pressure may be about 3 to 20 MPa. Particularly, it may be about 5 to 10 MPa.

Further, as in non-limiting examples, the polymer electrolyte membrane 104 may be substituted with protons (H$^+$).

Though undesirable, an electrolyte membrane or an ionomer in the catalyst layer substituted with sodium ions or potassium ions can also be used if wanted. In the case, the prepared MEA needs to be treated with sulfuric acid solution in order to substitute the sodium or potassium ions with protons.

A gas diffusion layer is attached on the anode and the cathode of thus prepared MEA. As in non-limiting examples, the gas diffusion layer may be carbon paper, carbon cloth or carbon felt. The gas diffusion layer may be placed on the MEA and be used without further pressing process. Alternatively, the gas diffusion layer may be placed on both sides of the MEA and be used after pressing under a temperature of 150° C. or lower and a pressure of 15 MPa or lower.

Figure 3:
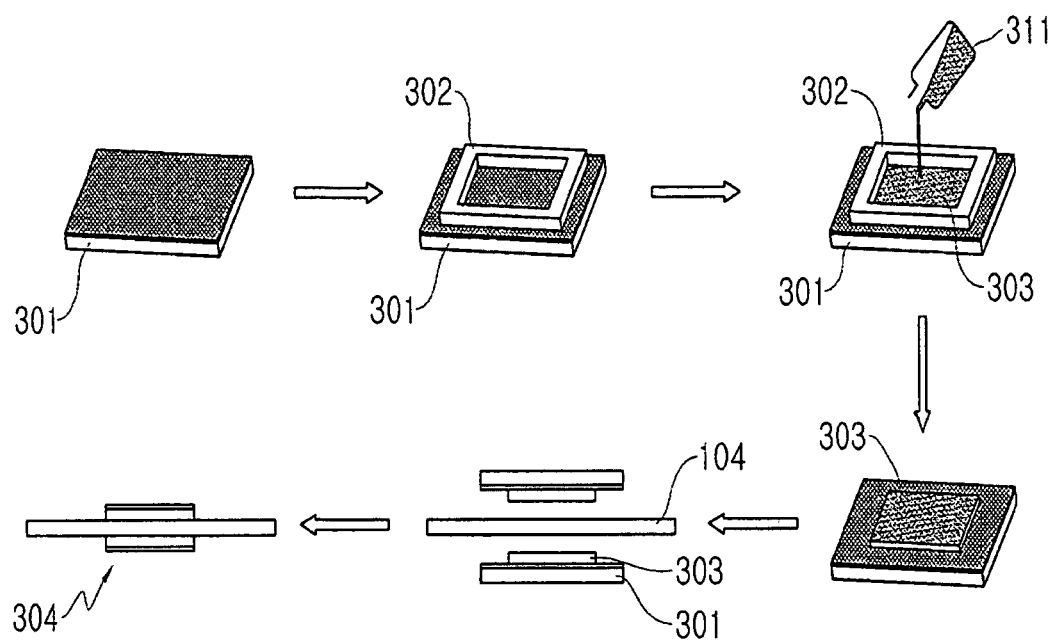
FIG. 3 schematically illustrates a method for preparing an MEA using a slurry drying method according to an embodiment.

FIG. 3 schematically illustrates a method for preparing an MEA using a slurry drying method according to an embodiment.

Referring to FIG. 3, a transfer substrate 301 on which a binder-free carbon layer is prepared.

At the outer circumference of the transfer substrate 301, an electrode frame 302 with a height is positioned. Then, a catalyst slurry 311 is poured in the electrode frame 302 and dried for an adequate period of time. Then, the catalyst frame 302 is removed from the transfer substrate 301 and the solvent is evaporated so as to form a catalyst layer 303. The use of the catalyst frame enables an effective formation of the catalyst layer on the binder-free carbon layer while preventing catalyst loss.

Thus formed catalyst layer is directly transferred to an electrolyte membrane. As a result, an MEA 304 is prepared.

The transfer substrate may be a non-ion-conductive polymer film. As in non-limiting examples, it may one or more selected from a group consisting of polytetrafluoroethylene (PTFE), perfluoroalkoxy (PFA), fluorinated ethylene propylene (FEP), polyvinylidene fluoride (PVDF), polypropylene (PP), polyimide (PI), polyethylene (PE), polycarbonate (PC) and polyethylene terephthalate (PET), or aluminum foil.

The polymer film may be a non-porous film without pores or a porous film having pores. A transfer substrate having pores may have a pore size of about 50 nm to 100 μm and a porosity of about 5 to 90%. The polymer film may have a thickness of about 0.01 to 1 mm.

Next, the transfer substrate on which the catalyst layer is formed is placed on both sides of the electrolyte membrane, and the catalyst layer is transferred to the electrolyte membrane by pressing under high temperature and pressure. As a result, the MEA 304 is prepared.

For reference, the slurry drying method described above may be used not only to form a catalyst layer on a transfer substrate but also to prepare an electrode by applying a catalyst layer on a GDL. As described above, the GDL may be carbon paper, carbon cloth, carbon felt, or the like having the same carbon with that of the binder-free carbon layer.

Figure 4A:
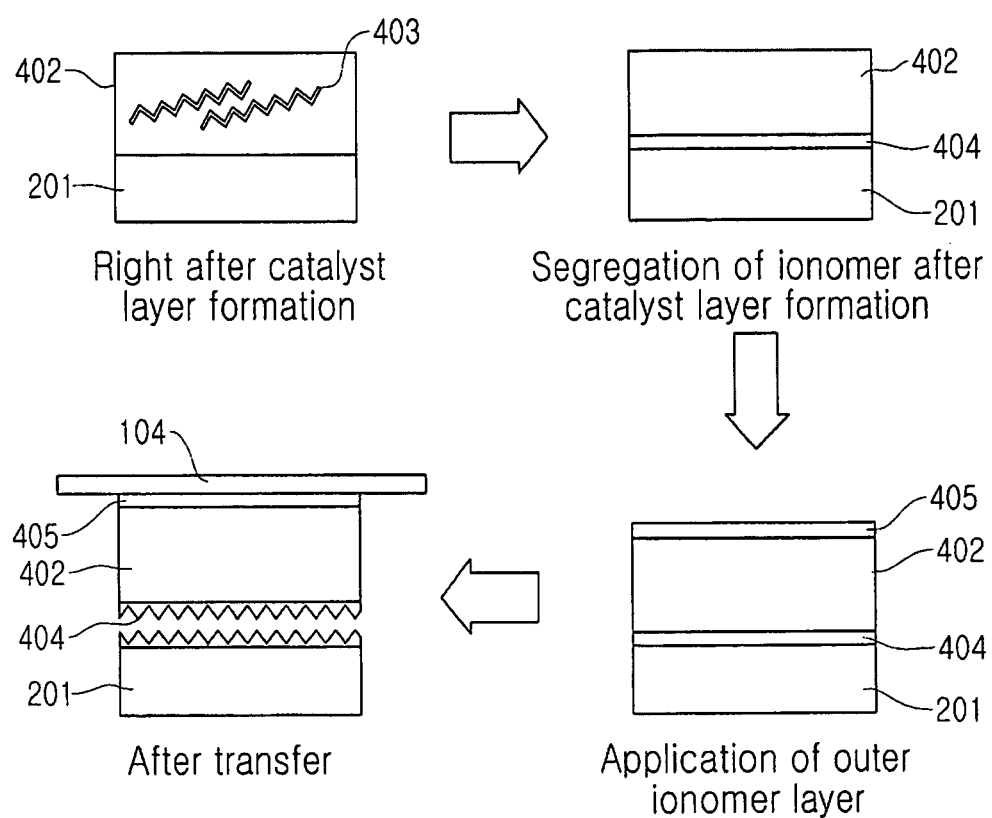
FIG. 4 schematically illustrates a method for preparing an MEA according to an embodiment wherein an ionomer skin layer 404 is not formed during the transfer process (FIG. 4b) as compared to the method wherein an ionomer skin layer 404 is formed (FIG. 4a)
Figure 4B:
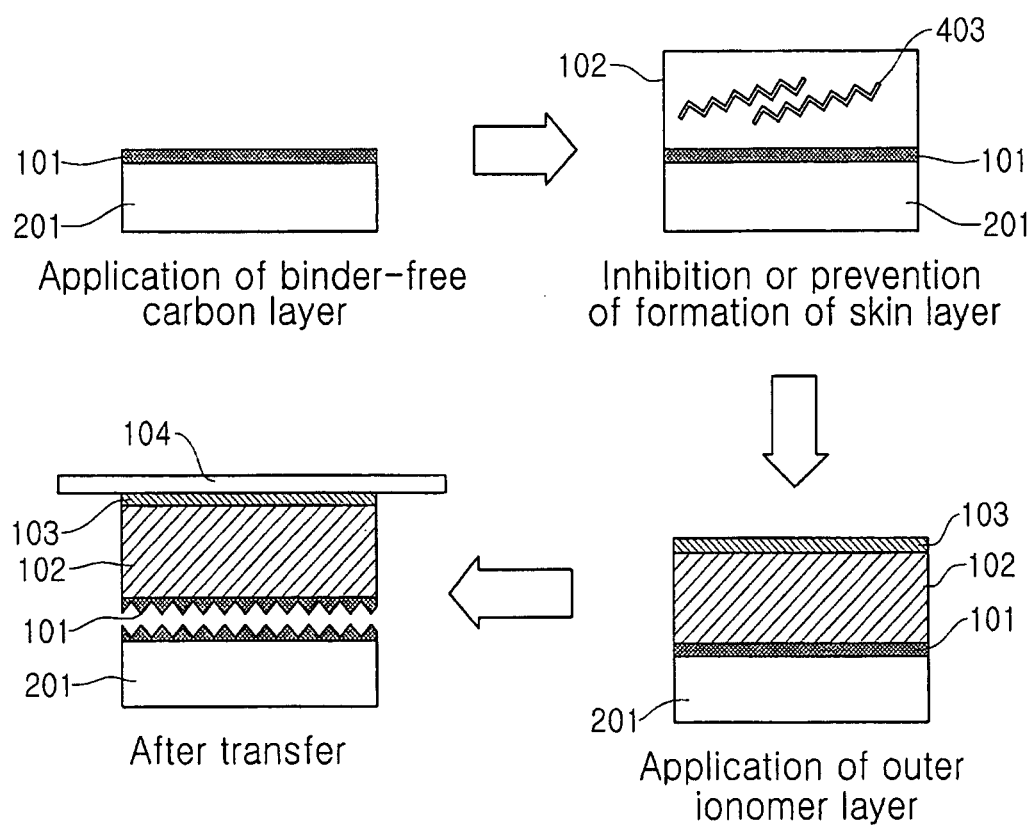

FIG. 4 schematically illustrates a method for preparing an MEA according to an embodiment wherein an ionomer skin layer 404 is not formed during the transfer process (FIG. 4b) as compared to the method wherein an ionomer skin layer 404 is formed (FIG. 4a).

Referring to FIG. 4a, when a catalyst layer 102 is directly applied on a transfer substrate 201 or when a binder-containing carbon layer is interposed therebetween, the ionomer 403 included in the catalyst layer or the binder included in the carbon layer is segregated at the interface and forms a thin skin layer 404. The skin layer 404 may act as barrier to material transport and as electrical resistance. The outer ionomer layer 405 is formed on the catalyst layer by coating an ionomer solution to facilitate the transfer of the catalyst layer onto the membrane. The outer ionomer layer 405, catalyst layer 402, part of skin layer 404 is transferred to a polymer electrolyte membrane 104.

On the other hand, referring to FIG. 4b, a binder-free carbon layer 101 formed between a transfer substrate 201 and a catalyst layer 102 prevents interaction of the transfer substrate 201 with the ionomer 403 included in the catalyst layer. The outer ionomer layer 103 is formed on the catalyst layer. Herein, the outer ionomer layer 103, catalyst layer 102, part of binder-free carbon layer 101 is transferred to a polymer electrolyte membrane 104.

For reference, the carbon powder included in the carbon layer may have properties similar or the same with those of the catalyst support and, therefore, has few negative effects on the performance of the fuel cell.

Further, as described earlier, the binder-free carbon layer inhibits or prevents the formation of any skin layer during the transfer and, thereby, improves the performance of the MEA.

The examples and experiments will now be described. The following examples and experiments are for illustrative purposes only and not intended to limit the scope of the present invention.

<COMPARATIVE EXAMPLE 1

MEA Prepared by Spray Direct Coating (Denoted as MEA 601 in Performance Measurement and as MEA 701 in Impedance Measurement)>

First, for preparation of an anode electrode, an adequate amount of Platinum-Ruthenium (Pt—Ru) Black catalyst (Johnson-Matthey Co.) is mixed with distilled water and subjected to ultrasonication. Then, an adequate amount of Nafion ionomer (DuPont) is added to the catalyst solution and ultrasonication is carried out again. The amount of the ionomer is set to be 10wt % of the weight of the catalyst. At last, isopropyl alcohol (IPA) is added to the catalyst-ionomer-water solution and ultrasonication is carried out. A Pt—Ru catalyst slurry is obtained.

The prepared Pt—Ru catalyst slurry is applied on a polymer electrolyte membrane (PEM) by spraying until the amount of the Pt—Ru catalyst per unit area reaches 3 mg Pt—Ru/cm$^2$.

Next, a cathode electrode is formed on the opposite side of the anode-supported electrolyte membrane. For preparation of the cathode electrode, a slurry is prepared as in the preparation of the anode using Pt Black catalyst and a catalyst layer is applied on the electrolyte membrane by spraying.

By applying the anode and the cathode catalyst layers on both sides of the electrolyte membrane as described above, a catalyst coated membrane is obtained.

TGPH-060 carbon paper (Toray Co.) is used as a gas diffusion layer (GDL). Two sheets of carbon paper cut to a size identical to the area of the electrode are placed on both sides of the catalyst coated membrane and pressing is carried out at 140° C. and 8 MPa. An MEA with the GDL is obtained.

The prepared MEA with the GDL is adjoined with a separator and performance is tested using a direct methanol fuel cell (DMFC) unit cell measurement instrument. Operation conditions are 80° C. and 1 atm, and 0.5 M methanol aqueous solution and air are supplied to the anode and the cathode, respectively.

<COMPARATIVE EXAMPLE 2

MEA Prepared by High-temperature Transfer Method by Substituting PEM with Na$^+$ (Denoted as MEA 605 in Performance Measurement and as MEA 705 in Impedance Measurement)>

An MEA is prepared using a catalyst slurry containing ionomer and substituting PEM with Na$^+$ as in existing transfer method.

A catalyst slurry is prepared in the same manner as Comparative Example 1 and NaOH is added to substitute the ionomer included in the catalyst slurry with Na$^+$. A PEM is substituted with Na$^+$ by heating for 1 hour in 1 M NaOH aqueous solution at 80° C. (hereinafter referred to as "Na-membrane"). The catalyst slurry substituted with Na$^+$ is applied on a transfer substrate by spraying.

Two transfer substrates on which a Pt catalyst layer and a Pt—Ru catalyst layer are applied, respectively, are placed on either side of the Na-membrane and the catalyst layers are transferred from the transfer substrates to the Na-membrane by hot pressing at 180° C. and 8 MPa.

The prepared MEA is immersed in sulfuric acid aqueous solution to substitute the PEM and the ionomer in the catalyst layer with $H^+$. Gas diffusion layers [TGPH-060 carbon paper (Toray Co.)] are overlapped on both sides of the MEA. A DMFC unit cell is constructed by adjoining with a separator without further hot pressing. Unit cell operation conditions are the same as Comparative Example 1.

<COMPARATIVE EXAMPLE 3

MEA Prepared by Low-temperature Transfer Method using Outer Ionomer only (Denoted as MEA 602 in Performance Measurement and as MEA 702 in Impedance Measurement)>

A catalyst slurry is prepared in the same manner as Comparative Example 1, applied on transfer substrates by spraying and then dried.

On the dried catalyst layers, ionomer is further applied at 0.1 mg/cm² (on the basis of dry weight). The catalyst layers with ionomer layer thereon are transferred to an $H^+$-type PEM by hot pressing at 140° C. and 8 MPa for 8 minutes to prepare an MEA. Gas diffusion layers [TGPH-060 carbon paper (Toray Co.)] are overlapped on both sides of the MEA. DMFC unit cell build-up and performance measurement are carried out as in Comparative Example 2.

<COMPARATIVE EXAMPLE 4

MEA Prepared by Low-temperature Transfer Method using Transfer Substrate on which Outer Ionomer Layer and Binder-containing Carbon Layer are Formed (Denoted as MEA 606 in Performance Measurement)>

A catalyst slurry is prepared in the same manner as Comparative Example 1. A binder-containing carbon slurry is prepared by dispersing carbon powder (Vulcan XC-72R, Cabot Co.), Nafion ionomer binder and IPA at a weight ratio of 1:0.1:1000. The prepared binder-containing carbon slurry is applied on a transfer substrate by spraying and the transfer substrate is dried in an oven at 80° C. (see FIG. 2).

The catalyst slurry is applied on the transfer substrate on which a binder-containing carbon layer is formed, and outer ionomer is further applied at 0.1 mg/cm² as in Comparative Example 3. Thereafter, the transfer substrate is completely dried.

Thus prepared transfer substrate on which the binder-containing carbon layer, the catalyst layer and the outer ionomer layer are formed is hot-pressed at 140° C. and 8 MPa for 8 minutes to transfer the same from the transfer substrate to a PEM so as to prepare an MEA.

Gas diffusion layers [TGPH-060 carbon paper (Toray Co.)] are overlapped on both sides of the MEA. DMFC unit cell build-up and performance measurement are carried out as in Comparative Example 2.

<EXAMPLE 1

MEA Prepared by Low-temperature Transfer Method using Transfer Substrate on which Outer Ionomer Layer and Binder-free Carbon Layer are Formed (Denoted as MEA 603 in Performance Measurement and as MEA 703 in Impedance Measurement)>

A catalyst slurry is prepared in the same manner as Comparative Example 1. A binder-free carbon slurry is prepared by dispersing carbon powder (Vulcan XC-72R, Cabot Co.) and IPA at a weight ratio of 1:1000. The prepared binder-free carbon slurry is applied on a transfer substrate by spraying and the transfer substrate is dried in an oven at 80° C. (see FIG. 2).

The catalyst slurry is applied on the transfer substrate on which a binder-free carbon layer is formed, and outer ionomer is further applied at 0.1 mg/cm² as in Comparative Example 3. Thereafter, the transfer substrate is completely dried.

Thus prepared transfer substrate on which the binder-free carbon layer, the catalyst layer and the outer ionomer layer are formed is hot-pressed at 140° C. and 8 MPa for 8 minutes to transfer the same from the transfer substrate to a PEM so as to prepare an MEA.

Gas diffusion layers [TGPH-060 carbon paper (Toray Co.)] are overlapped on both sides of the MEA. DMFC unit cell build-up and performance measurement are carried out as in Comparative Example 2.

<EXAMPLE 2

MEA Prepared by Slurry Drying Method using Transfer Substrate and Electrode Frame (Denoted as MEA 604 in Performance Measurement)>

An electrode frame with a size corresponding to the area of the electrode is placed on a transfer substrate having the binder-free carbon layer identical to that prepared in Example 1. A catalyst slurry identical to that prepared in Comparative Example 1 is poured in the electrode frame and then dried (see FIG. 3).

The amount of catalyst is set as 3 mg/cm² for both the anode and the cathode on the basis of the metal catalyst.

After drying, the electrode frame is removed, and the catalyst layer formed on the transfer substrate having the binder-free carbon layer is transferred from the transfer substrate to a PEM by pressing at 140° C. and 8 MPa for 8 minutes after placing the anode and cathode transfer substrates on either side of the PEM.

An MEA is obtained. Gas diffusion layers [TGPH-060 carbon paper (Toray Co.)] are overlapped on both sides of the MEA. DMFC unit cell build-up and performance measurement are carried out as in Comparative Example 2.

<Experiment: Difference in Performance and Impedance Depending on Method for Preparing an MEA>

The MEAs prepared by different methods are applied to a DMFC system in order to investigate the effect of the method for preparing an MEA on the performance of a fuel cell.

Figure 5:
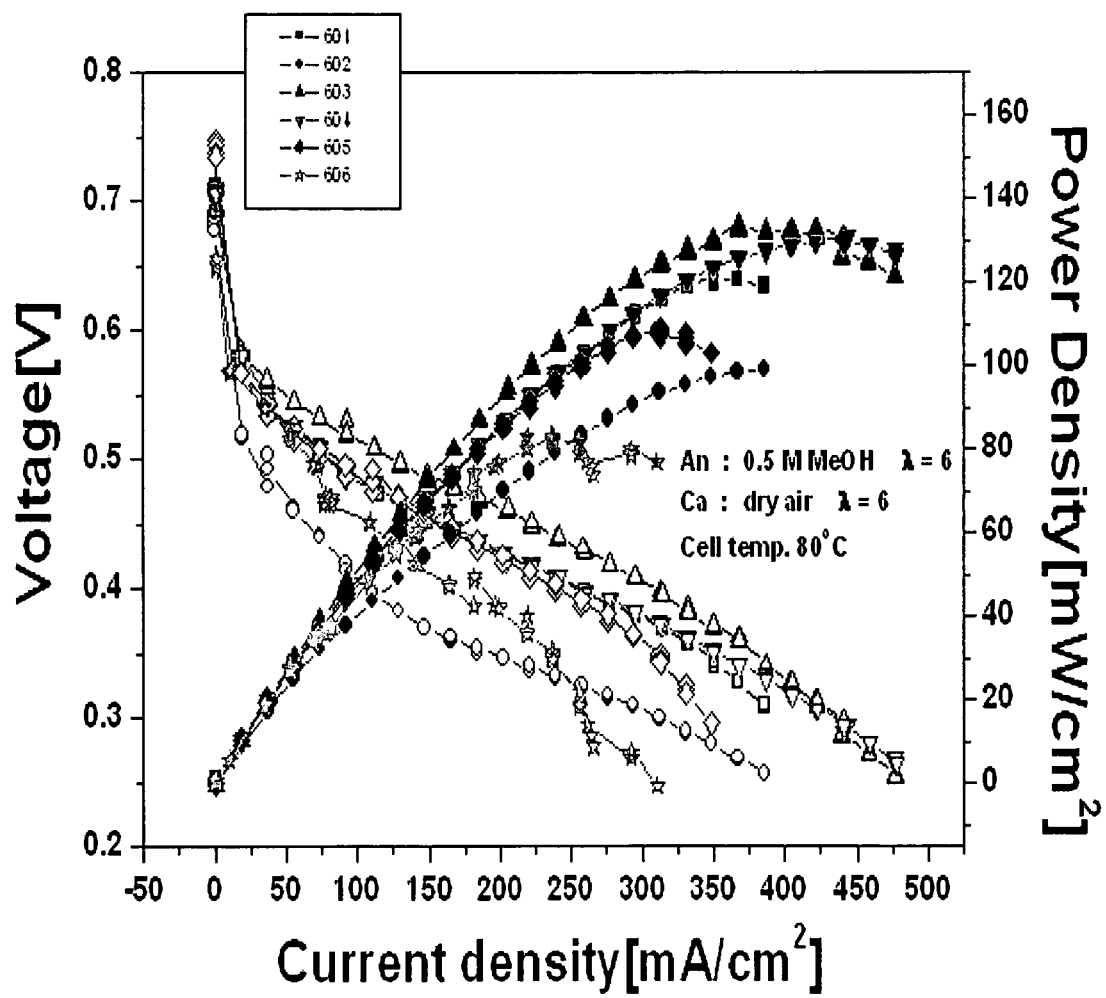
FIG. 5 shows a graph comparing the performance of a direct methanol fuel cell (DMFC) using the MEAs prepared in Examples with those prepared in Comparative Examples.

FIG. 5 shows a graph comparing the performance of a DMFC using the MEAs prepared in Examples with those prepared in Comparative Examples.

3 mg/cm² catalyst is used in the fuel electrode and air electrode, respectively. For reactants, 0.5 M methanol is supplied to the fuel electrode and dry air is supplied to the air electrode at a flow rate corresponding to 6 equivalents, respectively. Performance is measured at 80° C. and 1 atm.

MEA 605 prepared by existing high-temperature substitution transfer method and MEA 602 prepared by low-temperature transfer method using outer ionomer show the peak power of 109 mW/cm$^2$ and 100 mW/cm$^2$, respectively, lower than that of MEA 601 prepared by direct coating method (120 mW/cm$^2$) by 11 mW/cm$^2$ and 20 mW/cm$^2$, respectively.

The peak power of MEA 603 prepared in accordance with the embodiments by forming a binder-free carbon layer between the transfer substrate and the catalyst layer is 134 mW/cm$^2$, higher than that of MEA 605 prepared by existing high-temperature substitution transfer method and that of MEA 601 prepared by direct coating method by 25 mW/cm$^2$ and 14 mW/cm$^2$, respectively. Further, the performance is higher than the peak power of MEA 606 prepared by forming a binder-containing carbon layer (84 mW/cm$^2$) by 50 mW/cm$^2$.

As described above, in MEA 605 prepared by existing high-temperature substitution transfer method or MEA 602 prepared by low-temperature transfer method using outer ionomer only without using a binder-free carbon layer or MEA 606 prepared by low-temperature transfer method using a binder-containing carbon layer, the formation of an ionomer skin layer results in increased resistance to reactant and product transfer and decreased electrical conductivity. As a result, the overall performance decreases.

On the other hand, in MEA 603 prepared in accordance with this disclosure by forming a binder-free carbon layer between the transfer substrate and the catalyst layer, the binder-free carbon layer prevents the formation of an ionomer skin layer (see FIG. 5). In MEA 606 prepared by forming a binder-containing carbon slurry coating layer, the formation of an ionomer skin layer is not inhibited. On the contrary, the performance may be further decreased as the ionomer included in the carbon slurry coating layer is segregated.

Further, the formation of a binder-free carbon layer may lead to a perfect transfer of the catalyst layer by forming a separative interface between the binder-free carbon layer and the transfer substrate. This can be seen from the impedance analysis result of the MEAs presented in FIG. 6.

In contrast, as shown in FIG. 5, when using an MEA(606) having the binder-containing carbon layer (Nafion ionomer binder in the comparative example), the skin layer occurrence can not be prevented. To the contrary, ionomer contained in the carbon layer were additionally segregated to cause a further decrease of the performance. As well, the binder-containing carbon layer reduced the transfer efficiency of the catalyst layer.

Figure 6:
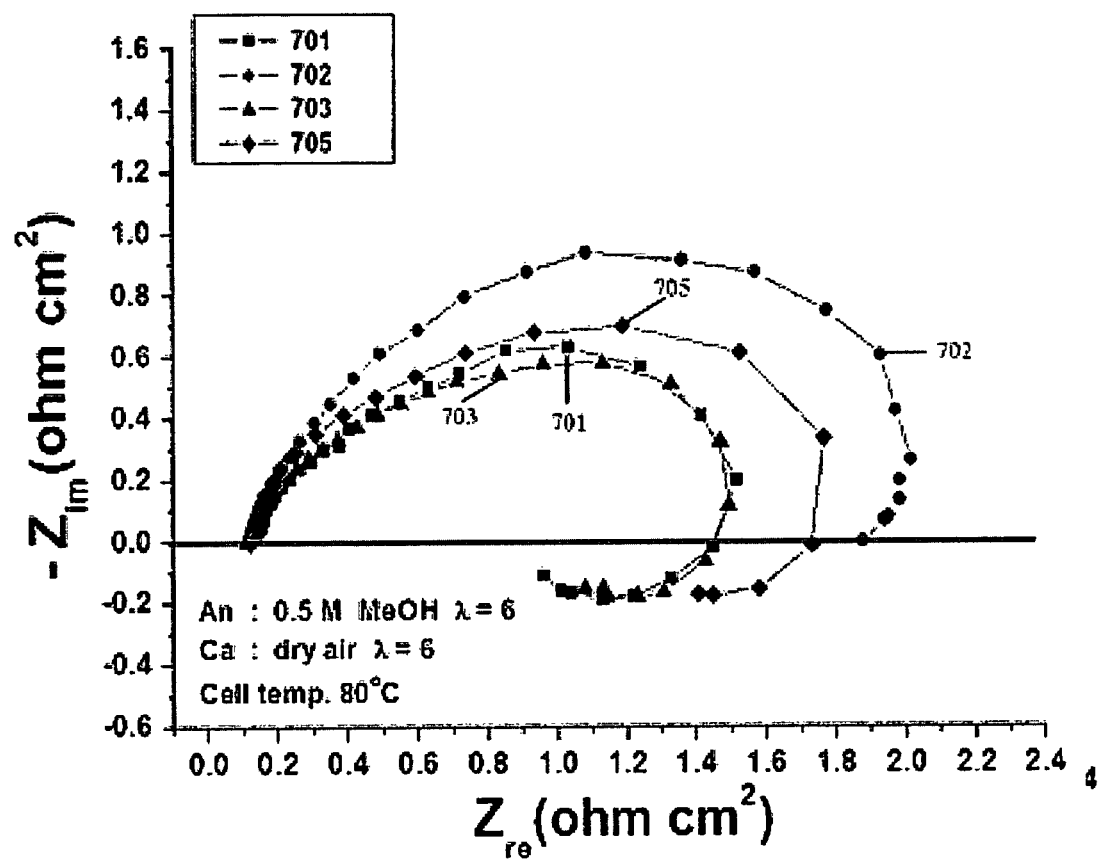
FIG. 6 shows an impedance analysis result of the MEAs prepared in Examples and Comparative Examples.

Referring to FIG. 6, MEA 605 prepared by existing high-temperature substitution transfer method and MEA 602 prepared by low-temperature transfer method using outer ionomer show a charge transfer resistance of 1.61 ohm cm$^2$ and 1.73 ohm cm$^2$, respectively, larger than that of MEA 601 prepared by direct coating method (1.36 ohm cm$^2$) by 0.25 ohm cm$^2$ and 0.37 ohm cm$^2$, respectively.

This indicates that the ionomer skin layer formed outside the catalyst layer results in increased electrical resistance between the catalyst layer and the GDL.

In contrast, MEA 603 prepared in accordance with this disclosure by forming a binder-free carbon layer between the transfer substrate and the catalyst layer shows a charge transfer resistance of 1.30 ohm cm$^2$, smaller than that of MEA prepared without forming a binder-free carbon layer by about 0.31 ohm cm$^2$. This indicates that the binder-free carbon layer inhibits or prevents the formation of an ionomer skin layer, thereby resulting in decreased electrical resistance.

MEA 604 prepared by low-temperature transfer after forming a catalyst layer by slurry drying, i.e. pouring of catalyst slurry on the transfer substrate using an electrode frame, shows the peak power of 130 mW/cm$^2$, comparable to that of MEA 603 (134 mW/cm$^2$). Further, catalyst loss during the MEA fabrication process are completely prevented because the catalyst layer is formed by the slurry drying method using an electrode frame.

As described, the method for preparing an MEA for a fuel cell according to embodiments enables a perfect transfer even at a low temperature of 140° C. or lower. Hence, the ion substitution process of the high-temperature transfer method can be omitted. Further, performance and long-term stability may be improved by preventing the formation of a thin skin layer due to interfacial segregation of the ionomer or binder and to this end by decreasing resistance to material transport and electrical resistance. Further, catalyst loss may be decreased to 0% by adopting a method of pouring catalyst using an electrode frame.

The low-temperature transfer method according to embodiments may be applied to prepare MEAs and fuel cells with good performance economically and in large scale.

While the exemplary embodiments have been shown and described, it will be understood by those skilled in the art that various changes in form and details may be made thereto without departing from the spirit and scope of the present invention as defined by the appended claims.

In addition, many modifications can be made to adapt a particular situation or material to the teachings of the invention without departing from the essential scope thereof. Therefore, it is intended that the present invention not be limited to the particular exemplary embodiments disclosed as the best mode contemplated for carrying out this invention, but that the present invention will include all embodiments falling within the scope of the appended claims.

What is claimed is:

1. A method for preparing a membrane electrode assembly (MEA) using a low-temperature transfer method, which comprises:
   coating a carbon slurry consisting of carbon powder and solvent on a transfer substrate and drying the carbon slurry to form a carbon layer, the carbon layer being a binder-free;
   applying a catalyst slurry on the binder-free carbon layer to form a catalyst layer; and
   transferring the binder-free carbon layer and the catalyst layer to a polymer electrolyte membrane,
   wherein the binder-free carbon layer has no skin layer of ionomer or binder, the carbon layer has a carbon content of about 0.01 to 2 mg/cm$^2$ based on electrode area, and the carbon layer has a thickness of about 0.01 to 50 μm.

2. The method according to claim 1, wherein an outer ionomer layer is further formed on the catalyst layer, and the binder-free carbon layer, the catalyst layer and the outer ionomer layer are transferred to the polymer electrolyte membrane.

3. The method according to claim 1, wherein an electrode frame is attached to the transfer substrate on which the binder-free carbon layer is formed, the catalyst slurry is applied inside the electrode frame to form the catalyst layer and the catalyst frame is removed.

4. The method according to claim 1, wherein an electrode frame is attached to the transfer substrate on which the carbon layer is formed, the electrode frame is removed after the catalyst layer is formed by applying the catalyst slurry inside the electrode frame, an outer ionomer layer is formed on the catalyst layer, and the binder-free carbon layer, the catalyst layer and the outer ionomer layer are transferred to the polymer electrolyte membrane.

5. The method according to claim 1, wherein the carbon powder of the carbon layer is the same with the carbon powder contained in a gas diffusion layer.

6. The method according to claim 5, wherein the carbon powder is one or more selected from the group consisting of graphite, carbon black, activated carbon, carbon fiber, carbon nanotube.

7. The method according to claim 1, wherein the carbon powder has a particle size of about 5 nm to 10 μm.

8. The method according to claim 1, wherein the transfer substrate is formed of aluminum foil or one or more polymer material selected from a group consisting of polytetrafluoroethylene (PTFE), perfluoroalkoxy (PFA), fluorinated ethylene propylene (FEP), polyvinylidene fluoride (PVDF), polypropylene (PP), polyimide (PI), polyethylene (PE), polycarbonate (PC) and polyethylene terephthalate (PET).

9. The method according to claim 1, wherein the transfer substrate is a non-porous substrate or a porous substrate.

10. The method according to claim 1, wherein the transfer substrate is a porous substrate having a pore size of about 100 μm or less and a porosity of about 90% or less.

11. The method according to claim 1, wherein the transferring is carried out at a transfer temperature of about 25 to 140° C. and a transfer pressure of about 1 to 20 MPa.

12. An MEA prepared according to claim 1.

13. A fuel cell comprising an MEA prepared according to claim 1.

* * * * *